Figure 1:
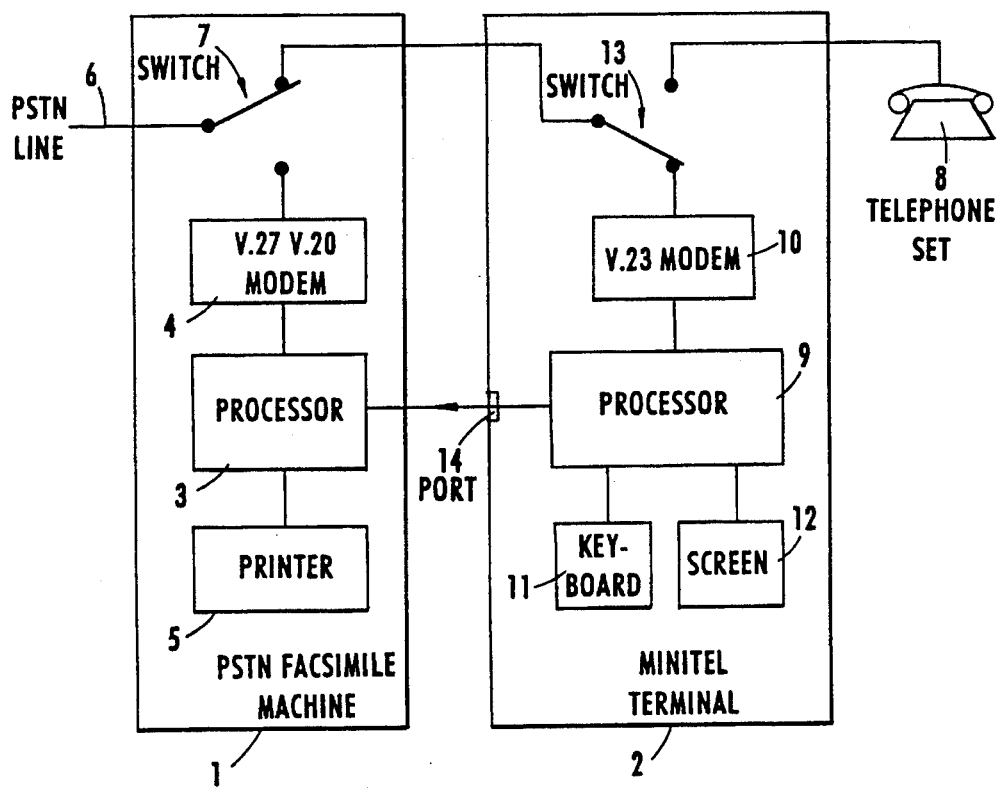

United States Patent [19]

Charbonnier

[11] Patent Number: 5,535,016
[45] Date of Patent: Jul. 9, 1996

[54] STATION COMBINING A MINITEL-TYPE VIDEOTEX TERMINAL WITH A FACSIMILE MACHINE

[75] Inventor: Philippe Charbonnier, Yvelines, France

[73] Assignee: Societe d'Applications Generales d'Electricite et de Mecanique Sagem, Paris, France

[21] Appl. No.: 1,716

[22] Filed: Jan. 7, 1993

[30] Foreign Application Priority Data

Jan. 14, 1992 [FR] France .................................. 92 00298

[51] Int. Cl.⁶ ..................................................... H04N 1/32
[52] U.S. Cl. ........................... 358/442; 358/400; 358/468; 379/100
[58] Field of Search ...................................... 358/400, 468, 358/442, 467, 462, 434, 439, 426, 436, 435, 438; 379/100, 94, 93, 96, 97, 98; 375/8, 9, 14, 7

[56] References Cited

U.S. PATENT DOCUMENTS 4,964,154  10/1990  Shimotono ................................ 379/93
4,996,707  2/1991   O'Malley et al. ........................ 379/94
5,196,943  3/1993   Hersee et al. ............................ 379/100
5,228,128  7/1993   Kim ......................................... 358/442

FOREIGN PATENT DOCUMENTS 0292355  11/1988  France .
0394096  10/1990  France .

OTHER PUBLICATIONS

Staudinger, "Evolution of Telematic Terminal Equipment in an OSI & ISDN Environment as seen from the Viewpoint of the CCITT Study Group VIII", *The New World of the Information Society*, Oct. 30, 1984, pp. 293–298.

Patent Abstracts of Japan, vol. 12, No. 285 (E–642), Aug. 4, 1988.

*Primary Examiner*—Edward L. Coles, Sr.
*Assistant Examiner*—Fan Lee
*Attorney, Agent, or Firm*—Lowe, Price, LeBlanc & Becker

[57] ABSTRACT

A Minitel videotex terminal is connected to the processor of a facsimile machine and internal switches are controlled in response to activation of a man-machine interface key to permit the higher speed modem of the facsimile machine to be selectively utilized in lieu of the slower speed modem of the Minitel terminal. The arrangement permits other components of the Minitel terminal and the facsimile machine to operate in selective combinations.

8 Claims, 2 Drawing Sheets

STATION COMBINING A MINITEL-TYPE VIDEOTEX TERMINAL WITH A FACSIMILE MACHINE

Accordingly the present invention first concerns a station combining a Minitel terminal comprising a processor, a V.23 modem, a keyboard, a screen, a port and a switch to link a PSTN line either to the modem or to a telephone set, with a PSTN facsimile machine comprising a processor, a V.27ter and V.29 modem, a printer, protocol layers implemented in software and a switch to link the PSTN line either to the modem or to the telephone set, which is characterized in that the Minitel terminal processor is connected to the facsimile machine modem by the facsimile machine processor and the peripherals and terminals outlet of the Minitel terminal, the facsimile machine protocol layers comprising a layer of the X.32 type from pertinent CCITT recommendation for average speed videotex operation, and the facsimile machine comprising a man-machine interaction (MMI) key which, following connection between the PSTN line and the Minitel terminal modem, shall control the facsimile machine switch and switch the PSTN line from the Minitel terminal modem to the facsimile machine modem.

The invention is remarkable on two accounts.

In the first place, when a user uses the port of a Minitel terminal to hook it up to such equipment as a printer, as a rule this port is crossed by a data flow from the terminal processor to the outside. Now, within the scope of the invention, the data flow through the Minitel terminal port is in the opposite direction, communication being from the telephone line to the facsimile machine, to the port and to the Minitel terminal.

In the second place, it is possible by means of the invention to accelerate both the display on the Minitel terminal screen and remote printing, the facsimile machine behaving as an accelerating means of the Minitel terminal. For average speed processing, videotex teleprinting is carried out directly through the processor of the facsimile machine on the printer of same, whereas at low speed, teleprinting also is carried out on the facsimile machine printer but through the Minitel terminal modem and processor and through the facsimile machine processor.

In a significant embodiment mode of the station of the invention, the PSTN facsimile machine comprises photographic decoding means to allow the station so designed to access photographically coded videotex servers which are of average speed and hence inaccessible to a Minitel terminal which is able to display or print only characters. Short of the Minitel terminal being able to display on the screen the data transmitted by a photographic server, such data at least can be printed on the STN facsimile machine printer and seen on paper.

The invention also concerns a station combining a Minitel terminal comprising a processor, a V.23 modem, a keyboard and a screen, a port and a switch to link an PSTN line either to the modem or to a telephone set, and a facsimile machine linked to a line of the Integrated-Services Digital Network (ISDN) comprising a processor, a V.21- V.27ter and -V.29 modem, a printer, protocol layers and a connection interface to the line, which is characterized in that the Minitel terminal processor is linked to the facsimile machine modem by the facsimile machine processor and the port of the Minitel terminal, and in that the protocol layers of the facsimile machine include an X.32 layer.

The ISDN station does not basically differ from the PSTN station. Each solves in virtually the same manner a problem which in any event is unique, namely to accelerate the processing of a Minitel terminal. On account of this common problem, the two stations, ISDN and STN, of the invention, which provide very similar solutions, are linked by a single and identical conception of the invention. Moreover, considering the respective specific natures of the ISDN and PSTN networks, it was preferable and moreover more practical to dissociate them, even if it had been possible to define both by a set of common characteristics.

In a significant embodiment of the ISDN station of the invention, the facsimile machine modem is a V.23–V.21, -V.27ter and V.29 modem to provide the Minitel terminal with access to the commonplace videotex servers of the PSTN network in the absence of the PSTN line.

Preferably too, the facsimile machine of ISDN station comprises photographic decoding means.

The invention is elucidated in the description below in relation to the attached drawing.

Figure 2:
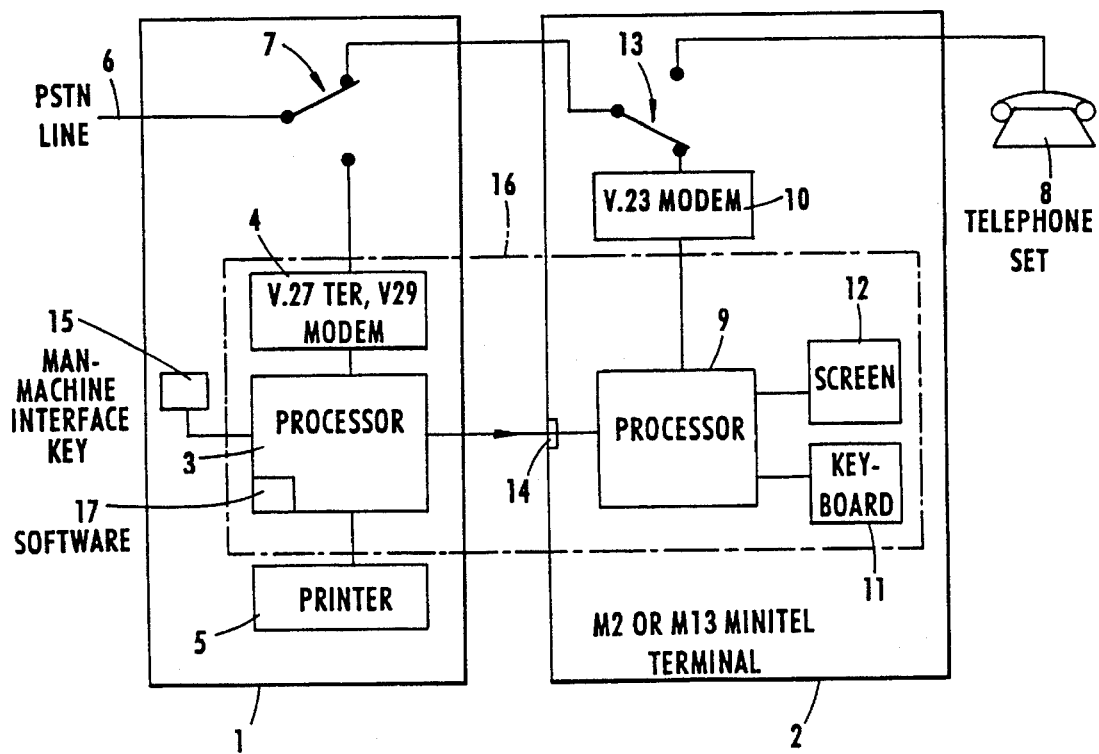
Figure 3:
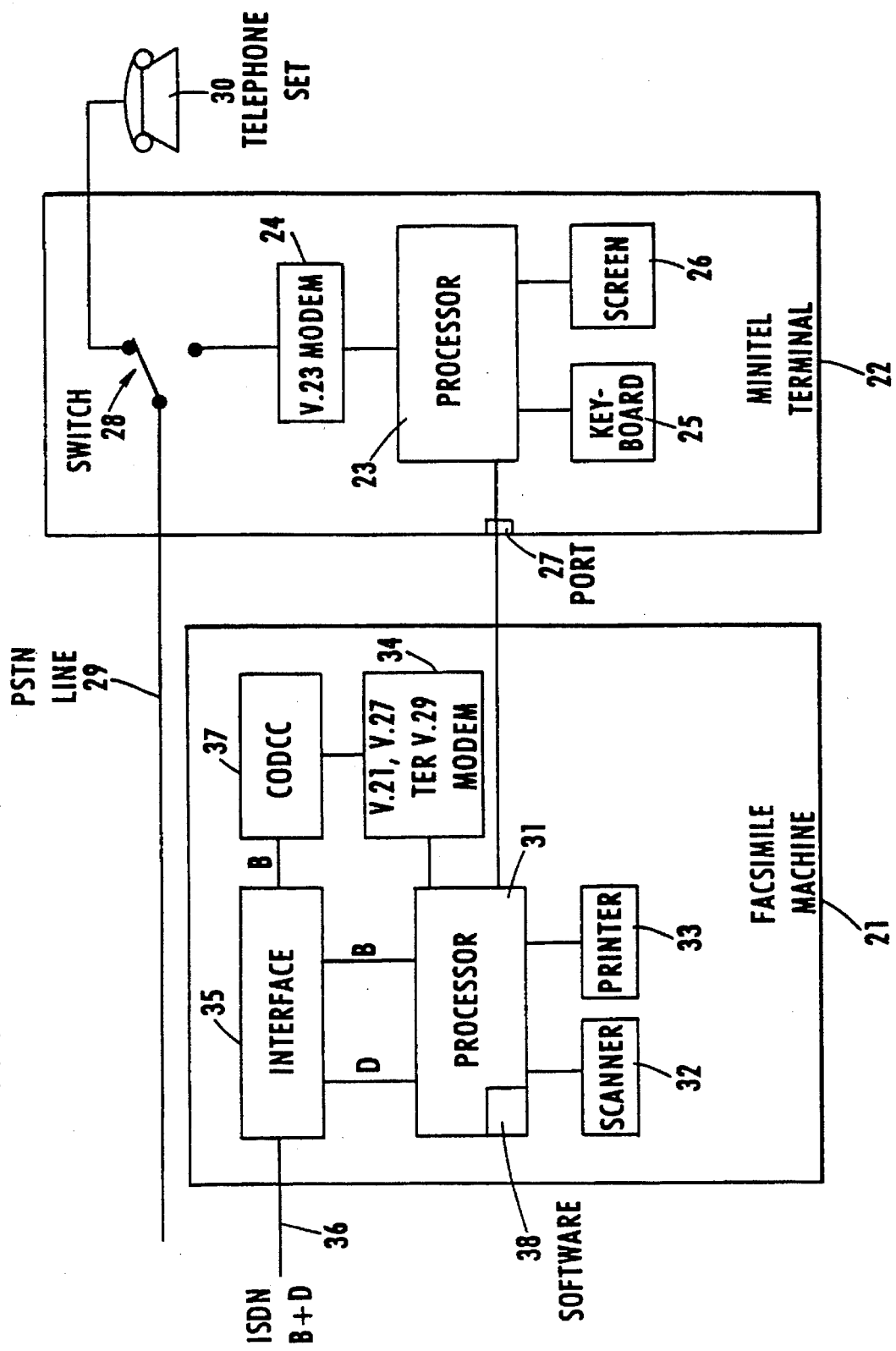

FIG. 1 is a functional diagram of a station associating an STN facsimile machine and a Minitel terminal at normal speed, FIG. 2 is a functional diagram of a station of the invention combining an STN facsimile machine with a Minitel terminal, and FIG. 3 is a functional diagram of a station of the invention combining an ISDN facsimile machine with a Minitel terminal.

The station of FIG. 1 associates a facsimile machine 1 with a low-speed Minitel terminal 2. Besides other well known components, the facsimile machine 1 also comprises a processor 3 and, linked to this processor 3, a V.27 and V.20 modem denoted by 4 and a printer 5. The processor 3 holds a memory storing protocol layers. The modem 4 may be linked to a line 6 of the PSTN network by a switch 7 which also may link this line through the terminal 2 to a telephone set 8.

Besides other well known components, the terminal 2 comprises a processor 9 and, linked to this processor 9, a V.23 modem referenced by 10, a keyboard 11 and a screen 12. The modem 10 can be linked to line 6 through a switch 13 actuated by a so-called "connect" key and furthermore the telephone set 8 can be linked to this same line 6 also by said switch 13. The terminal 2 furthermore comprises a port 14 connecting the two processors 3, 9.

The station of FIG. 1 is particular in that the printer 5 of the facsimile machine 1 is used as a peripheral of the terminal 2. In operation, the data flow from the terminal 2 through the port 14 toward the facsimile machine 1.

FIG. 2 shows an PSTN station of the invention which no longer associates but instead closely combines the facsimile machine and the Minitel terminal of which the same components will be denoted by the same references as in FIG. 1 for the sake of clarity. The two processors 3, 9 again are linked to each other through the port 14, that is, the processor 9 of the terminal 2 is linked to the modem 4 of the facsimile machine 1. The protocol layers of the storage 17 of the processor 3 comprise a layer X.32. The facsimile machine comprises a man-machine interaction (MMI) key 15 which, through the processor 3, can actuate the switch 7 so that, starting from the state shown in FIG. 2, wherein the modem 10 of terminal 2 is linked to line 6, the switch 7 can be thrown and link line 6 to the modem 4 of the facsimile machine and finally forman accelerated Minitel terminal 16 comprising the two processors 3, 9 linked by the port 14 through which the data flow passes from the facsimile machine toward the terminal, the modem 4 of the facsimile machine 1 and the keyboard 11 and the screen 12 of the terminal 2. Using a class known as M1B terminal 2 and the V.27ter part of the modem 4, the station can access 4,800 b/s servers and, with the V.29 part of the modem 4 and a class known as M2 terminal 2, the station can access 9,600 b/s servers, that is, the station makes possible a 4-to-8 times faster display.

Moreover the storage 17 of the facsimile machine 1 contains software for screen printing or for teleprinting in character or fax character, so that, regarding applications of faxing in fax code, wherein the data rate does matter, the station benefits from the increase in speed. The storage 17 also contains software decoding photographic screens, in this instance 64 shades of gray coded JPEG, and screen printing in 16 shades of gray.

If the terminal 2 is a photographic terminal, the facsimile machine stores in memory the flow passing through the port and upon demand will decode the latter screen and print it on the printer 5. If the terminal 2 is an ordinary terminal, then through its modem 4 the facsimile machine will communicate at average speed with the server and will feed the interactive screens minus the photographic portions to the terminal 2 for display. On the other hand, these interactive screens may be displayed directly on the printer 5 and thus be visualized.

The facsimile machine 1 in this case comprises a series thermal writing head with a bar 1,728 black and white dots wide. A videotex screen for a Minitel terminal contains 320×240 pixels in the form of 1,280×960 black and white dots, the 1280 dots being centered within the 1728 dots of the writing width. This is the reason for the reduction from 64 to 16 shades of gray. A videotex pixel is represented by a matrix of 4×4 black and white points allowing to render 16 shades of gray. The actual shade among 64 is approximated by the available nearest shade among 16.

FIG. 3 shows an ISDN station of the invention combining an ISDN facsimile machine 21 with a Minitel terminal 22. Just as the terminal 2, the terminal 22 comprises a processor 23 and, linked to this processor 23, a V.23 modem denoted by 24, a keyboard 25, a screen 26, a port 27 and a switch 28 by means of which either the modem 24 or a telephone set 30 can be linked to a STN line 29.

The ISDN facsimile machine 21 comprises a processor 31, and, linked to this processor, a scanner 32, a printer 33, a V.21, -V.27ter and -V.29 modem denoted by 34 and a connection interface 35 to a line 36 of the ISDN network and linked by a coder-decoder (codec) 37 to the modem 34. The processor 31 contains a memory 38 storing software and protocol layers and in particular photographic-screen decoding software JPEG. By means of the port 27, the processor 23 of the terminal 22 is linked to the facsimile machine processor 31 and accordingly to this machine's modem 34. The line 36 can transmit two B data channels of 64 kb/s and one signal channel D of 16 kb/s (ISDN 2B+D service). The processor 31 controls the ISDN access with the D channel protocols, further the communication on the B channel in the transparent mode TBCC (transparent B channel circuit) up to 64 kb/s with a stack of protocols (X.25 and ETS 300080) of G4 facsimile of average or high speed videotex operation, further the non-transparent B channel communication NTBCC through the codec 37 and the modem 34 with protocols for G3 faxing or for low speed videotex operation. The processor 31 also controls the ISDN telephone functions and the telephone and videotex applications on ISDN.

The facsimile machine 21 in this instance is used as an accelerating means for the Minitel terminal 22 to allow it to access average-speed servers of 9,600 b/s of the PSTN network through the B channel in the NTBCC mode, by means of the V.27ter and -V.29 functions of the modem 34, the protocols X.32 and ETS 300079, and to the high-speed servers at 64 kb/s, however slowed down to 9,600 b/s by controlling the flow in the processor 31, through the B channel in the TBCC mode and the X.25 protocols of the layer X.32 and ETS 300080. Thanks to the software decoding photographic screens, the printer 33 can print screens transmitted from the servers at average and high speed.

Regarding the increase in display speed of the terminal 22, it obviously does depend on the kind of terminal and on the speed which its port can support (4,800 b/s for a terminal M1B, 9,600 b/s for a terminal M2).

If the station were not directly serviced by the line 29 and if an "inflated" modem V.23-V.21-V.27ter–V.29 were present, the facsimile machine 21 would allow the terminal 22 to access the commonplace low speed videotex servers of the PSTN network through the channel B in the NTBCC mode and by means of the function V.23 of the modem 31.

I claim:

1. A station combining (a) a Minitel terminal comprising a processor, a V.23 modem, a keyboard, a screen, a port and a switch to link a public switching telephone network PSTN line either to a telephone set or to the V.23 modem, with (b) a PSTN facsimile machine comprising a processor, a V.27ter and V.29 modem, a printer, software implementing layers of a protocol and a switch to link the PSTN line either to the V.27ter and V.29 modem or to the telephone set, characterized in that (1) the processor of the Minitel terminal is linked to the modem of the facsimile machine by the processor of the facsimile machine and by the port of the Minitel terminal, (2) the software implementing the layers of the protocol of the facsimile machine comprises an X.32 layer and (3) the facsimile machine comprises means for switching from the modem of the Minitel terminal to the modem of the facsimile machine following link up of the PSTN line and the modem of the Minitel terminal.

2. A station defined in claim 1, wherein the facsimile machine comprises photographic decoding means to access gray scale coded, medium speed videotex servers.

3. A station defined in claim 1, wherein the facsimile machine contains software for screen printing and teleprinting with character and fax coding.

4. Station defined in claim 1, wherein said Minitel terminal is a photographic terminal.

5. A station combining (a) a Minitel terminal, comprising a processor, a V.23 modem, a keyboard and a screen, a port and a switch to link a public switched telephone network (PSTN) line either to the modem or to a telephone set, with (b) a facsimile machine linked to an ISDN line of an integrated services digital network and comprising a processor, a V.21, V.27ter and V.29 modem, a printer, software implementing layers of a protocol and an interface connecting to the ISDN line, characterized (1) in that the processor of the Minitel terminal is linked to the modem of the facsimile machine by the processor of the facsimile machine and by the port of the Minitel terminal, and (2) in that the layers of the protocol of the facsimile machine comprise a layer X.32.

6. A station defined in claim 5, wherein the modem is a V.23, V.21, V.27ter and V.29 modem.

7. A station defined in claim 5, wherein the facsimile machine comprises means for decoding gray scale images.

8. A station defined in claim 5, wherein the facsimile machine is arranged to allow ISDN transparent B channel circuit TBCC mode access by the Minitel terminal to B channel rate servers throttled down to 9,600 b/s by flow control software implementing the communication protocols.

* * * * *